(12) United States Patent
Moote (10) Patent No.: US 6,766,554 B1
(45) Date of Patent: Jul. 27, 2004

(54) LOW ACCELERATION SYMMETRICAL OVERLAP WIPER SYSTEM

(75) Inventor: Donald Bruce Moote, Portland, OR (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 428 days.

(21) Appl. No.: 09/585,515

(22) Filed: Jun. 1, 2000

(51) Int. Cl.[7] ............................... B60S 1/24; B60S 1/18
(52) U.S. Cl. .............................. 15/250.14; 15/250.27; 15/250.3; 74/42; 74/43; 74/51
(58) Field of Search ..................... 15/250.27, 250.3, 15/250.31, 250.14, 250.21, 250.23, 250.16; 74/42, 51, 43

(56) References Cited

U.S. PATENT DOCUMENTS

| | | | | |
|---|---|---|---|---|
| 3,025,554 A | * | 3/1962 | Ziegler | 15/250.14 |
| 3,125,777 A | * | 3/1964 | Leininger | 15/250.14 |
| 3,144,672 A | * | 8/1964 | Fehrenbach | 15/250.14 |
| 3,226,755 A | | 1/1966 | Fox et al. | 15/250.14 |
| 3,336,619 A | * | 8/1967 | Hoyler | 15/250.14 |
| 4,672,709 A | | 6/1987 | Licata et al. | 15/250.27 |
| 4,843,898 A | | 7/1989 | Ishikawa | 15/250.31 |
| 4,969,227 A | | 11/1990 | Reed et al. | 15/250.27 |
| 5,005,249 A | | 4/1991 | Nishizawa et al. | 15/250.27 |
| 5,142,729 A | | 9/1992 | Imamura | 15/250.3 |
| 5,226,200 A | * | 7/1993 | Buchanan et al. | 15/250.13 |
| 5,894,652 A | | 4/1999 | Hoshino | 15/250.27 |

FOREIGN PATENT DOCUMENTS

GB          910501     * 11/1962  ............. 15/250.14

* cited by examiner

Primary Examiner—Gary K. Graham
(74) Attorney, Agent, or Firm—J. Gordon Lewis (57) ABSTRACT

A windshield wiper drive imparts overlapping butterfly oscillation to a pair of spaced wiper shafts from a rotary drive member having a crank arm. A drive link is provided having first, second, and third connection points. The first connection point is adjacent one end of the drive link and is pivotally connectable to the crank arm of the rotary drive member. The second connection point is adjacent an opposite end of the drive link, and the third connection point is interposed between the first connection point and the second connection point along the drive link. An idler pivot link is pivotable about a fixed axis and has at least three crank arms extending radially from the fixed axis and spaced from one another. A first elongate link is pivotally connected at one end to a first crank arm of the idler pivot link, and is pivotally connected at an opposite end to the second connection point of the drive link. A second elongate link is pivotally connected at one end to a second crank arm of the idler pivot link, and is pivotally connected at an opposite end to the third connection point of the drive link. The first and second elongate links cross with respect to one another between the idler pivot link and the drive link. A third elongate link is pivotally connected at one end to a third crank arm of the idler pivot link, and is pivotally connectable at an opposite end for driving a first one of the pair of spaced wiper shafts.

18 Claims, 7 Drawing Sheets

LOW ACCELERATION SYMMETRICAL OVERLAP WIPER SYSTEM

FIELD OF THE INVENTION

The present invention relates to windshield wipers for vehicles, and specifically to a drive mechanism for one or a pair of vehicle wipers of the type that overlap with respect to an inner wiping area.

BACKGROUND OF THE INVENTION

Many vehicles include wipers that wipe back and forth simultaneously in the same direction using a tandem system. Some wiper systems operate simultaneously and in opposite directions, from a lowermost, inner wipe position to an outermost, outer wipe position and back. Wipers on large windshields are occasionally long enough so that the wipers overlap at the inner wipe area, with one wiper resting on top of the other wiper at the inner wipe position. In these situations, the drive mechanism includes a provision for preventing the top and bottom wiper from colliding as the lower wiper leaves the inner wipe position at the beginning of a wipe cycle, and as the wipers return to the inner wipe position at the end of the wipe cycle. Typically, a drive mechanism for such a system includes a bell crank linkage designed to begin moving the top wiper up from the inner wipe position faster than the bottom wiper at the beginning of the wipe cycle in order to prevent a collision between the wipers. The bell crank type of mechanism produces an undesirable result in that one of the wipers experiences sudden acceleration or whip at the outer wipe position, which can potentially take it past the ideal outer wipe position. This effect is particularly noticeable when the wipers are set at a high wiping speed.

SUMMARY OF THE INVENTION

The present invention relates to a windshield wiper mechanism including a pair of oscillated wiper blades having an overlapping wiping pattern at an inboard stroke end and so as to substantially increase the wiped area of the windshield. The present invention provides a drive mechanism for oscillating the pair of overlapping wiper blades without interference. The drive mechanism imparts oscillation to a pair of spaced apart wiper blades from a rotary crank to obtain an overlapping wiping pattern adjacent the inboard stroke ends. The drive mechanism prevents collisions in the innerwipe position without causing high acceleration at the outerwipe position even at high speed wiper oscillation.

A windshield wiper drive according to the present invention imparts overlapping butterfly oscillation to a pair of spaced wiper shafts from a rotary drive member having a crank arm. A drive link is provided having first, second, and third connection points. The first connection point is adjacent one end of the drive link and pivotally connectable to the crank arm of the rotary drive member. The second connection point is adjacent an opposite end of the drive link. The third connection point is interposed between the first connection point and the second connection point along the drive link. An idler pivot link is pivotable about a fixed axis and has at least three crank arms extending radially from the fixed axis and spaced from one another. A first elongate link is pivotally connected at one end to a first crank arm of the idler pivot link and is pivotally connected at an opposite end to the second connection point of the drive link. A second elongate link is pivotally connected at one end to a second crank arm of the idler pivot link, and is pivotally connected at an opposite end to the third connection point of the drive link. The first and second elongate links cross with respect to one another between the idler link and the drive link. A third elongate link is pivotally connected at one end to a third crank arm of the idler pivot link and is pivotally connected at an opposite end for driving a first one of the pair of the spaced wiper shafts. Optionally, a fourth elongate link is pivotally connected at one end to a fourth crank arm of the idler pivot link, and is pivotally connected at an opposite end for driving a second one of the pair of spaced wiper shafts. Alternatively, a fourth elongate link can be pivotally connectable at one end to the crank arm of the rotary drive member and pivotally connectable at an opposite end for driving a second one of the pair of spaced wiper shafts.

In a windshield wiper drive system according to the present invention for imparting overlapping butterfly oscillation to a pair of spaced wiper shafts, an idler pivot link is connectable to at least one of the pair of spaced wiper shafts for imparting lower acceleration oscillation in proximity to a reversal position of each connected wiper shaft then the acceleration imparted intermediate a parked position and the reversal position of each connected wiper shaft. The idler pivot link is rotatable about a fixed axis and is connectable to at least one of the spaced wiper shafts for imparting a dwell in oscillation in proximity to a parked position of at least one of the connected wiper shafts.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
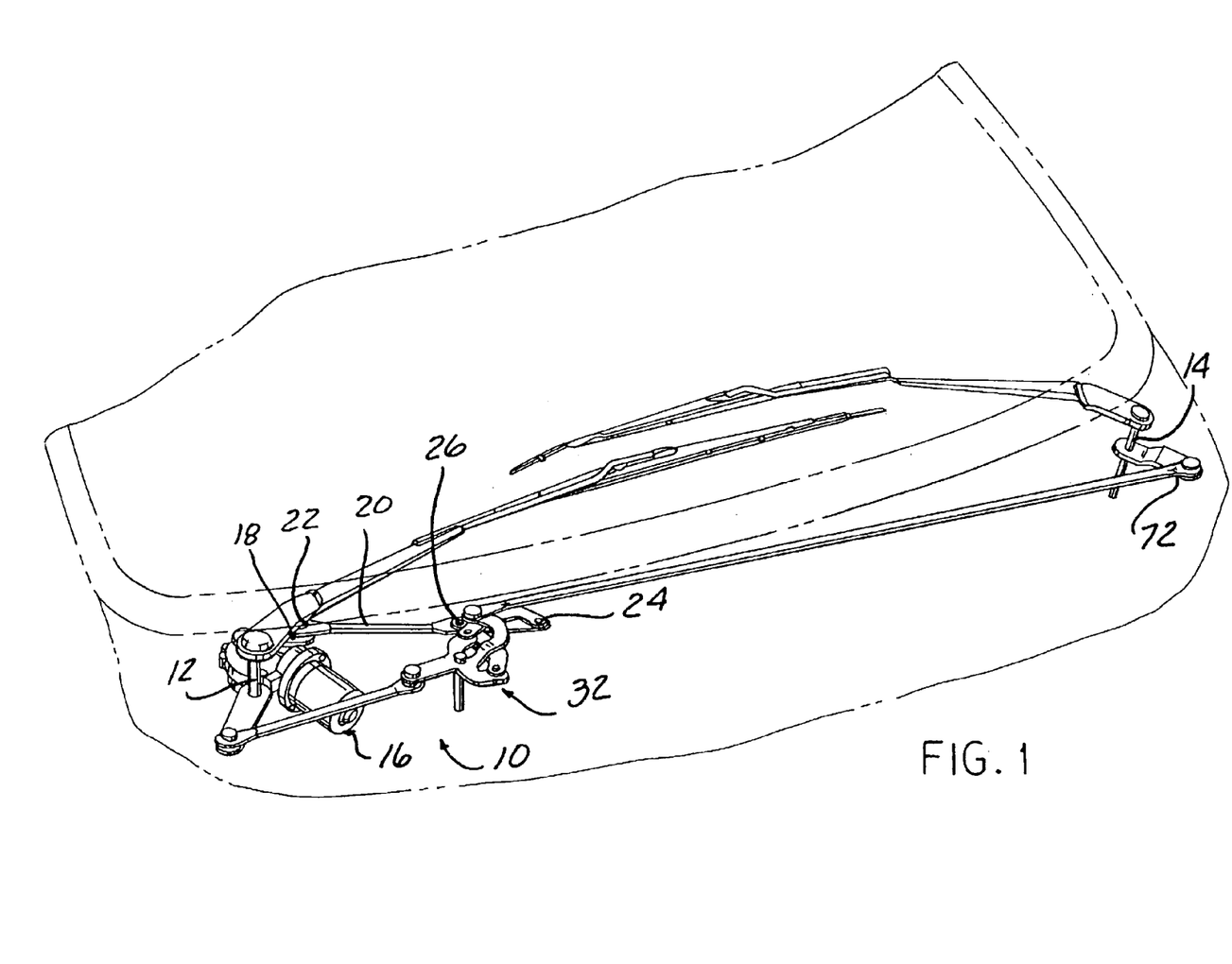
FIG. 1 is a perspective view of a windshield wiper drive system according to the present invention for imparting overlapping butterfly oscillation to a pair of spaced wiper shafts from a rotary drive member having a crank arm.
Figure 2:
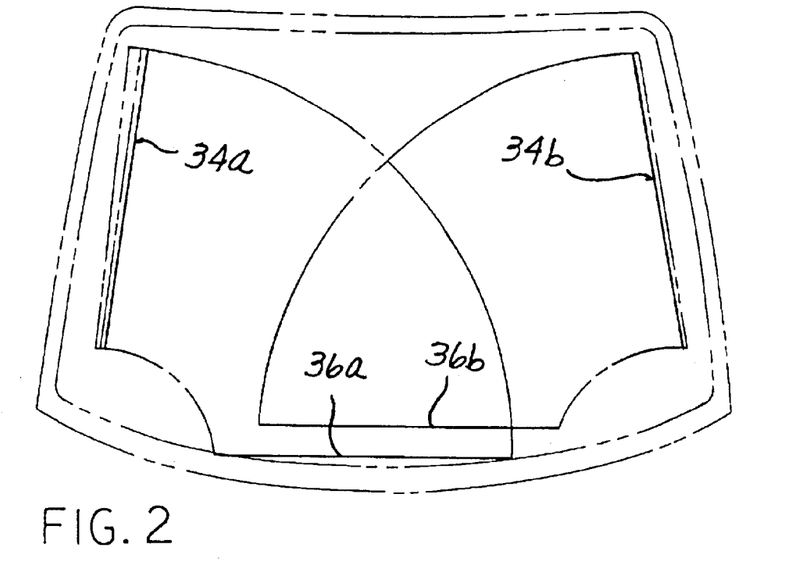
FIG. 2 is a schematic representation of a windshield showing the wiped areas resulting from the overlapping butterfly oscillation of the pair of spaced wiper shafts with a nominal position and a high speed position noted at the outer ends of the wiped area for each wiper.
Figure 3:
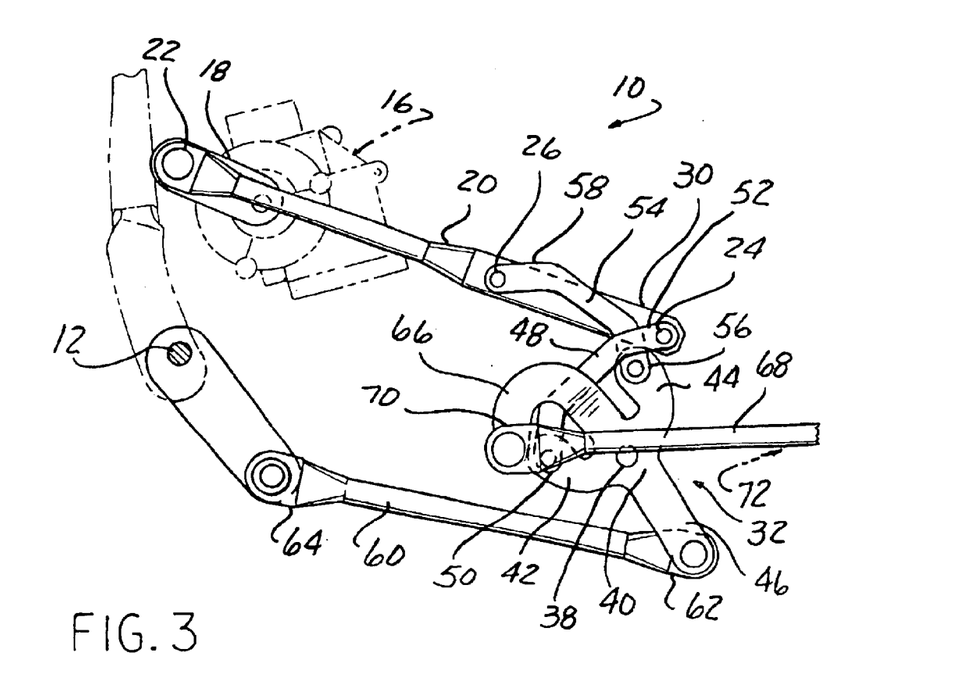
FIG. 3 is a detailed plan view of the windshield wiper drive with the wiper in the outer position.
Figure 4:
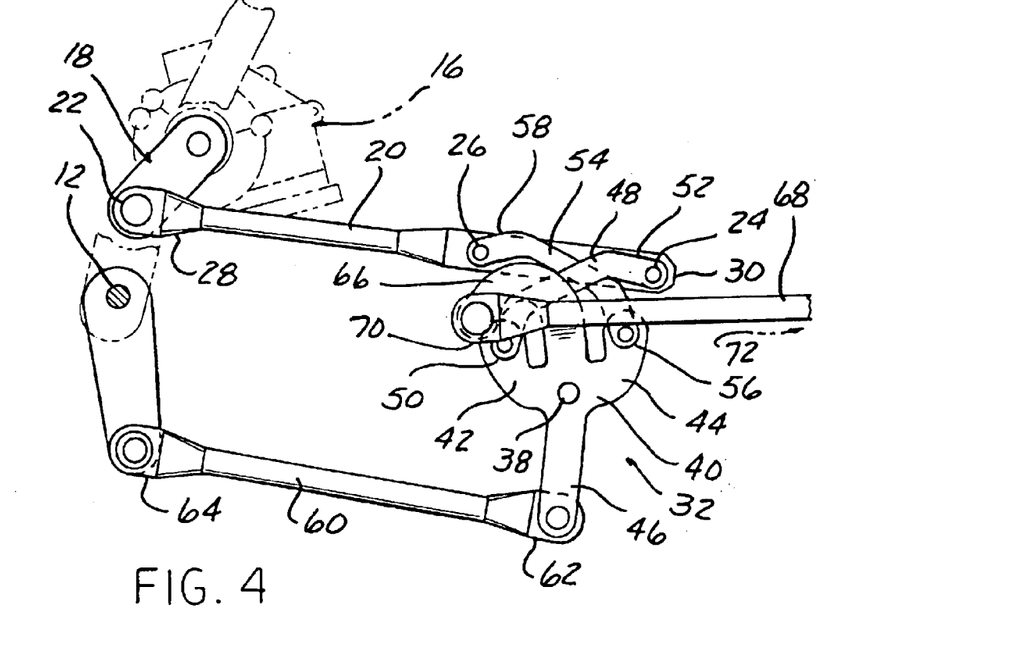
FIG. 4 is a detailed view of the windshield wiper drive with the wiper in an intermediate position.
Figure 5:
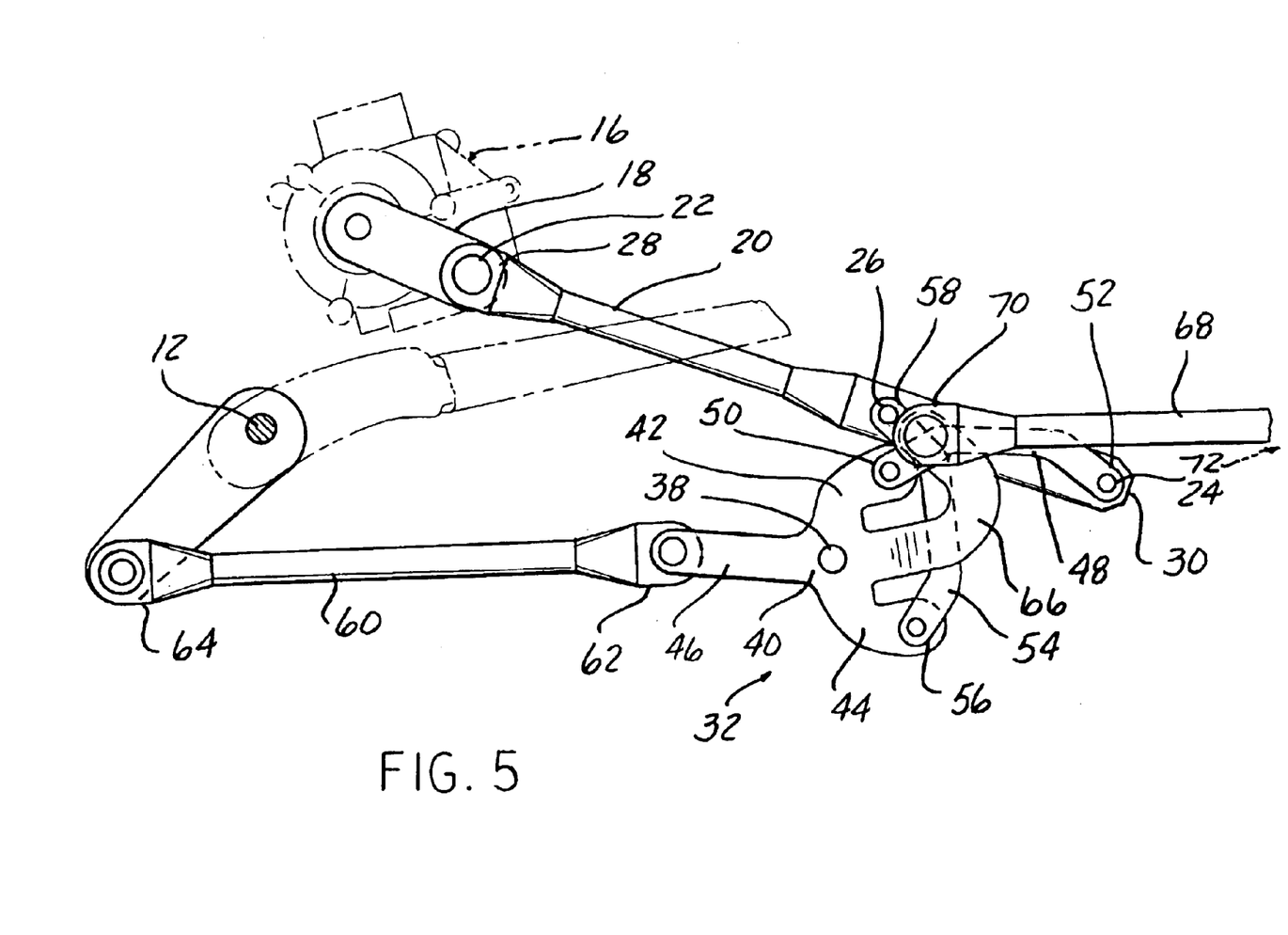
FIG. 5 is a detailed view of the windshield wiper drive with the wiper in an inner position.
Figure 6:
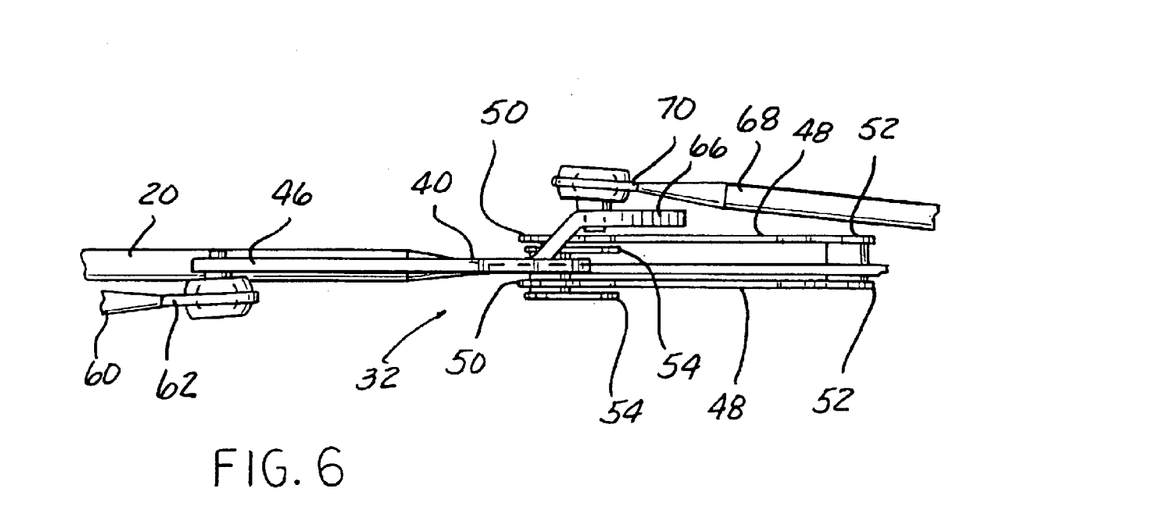
FIG. 6 is a side elevational view of the idler pivot link according to the present invention.

Referring now to FIGS. 1–6, a windshield wiper drive 10 is illustrated for imparting overlapping butterfly oscillation to a pair of spaced wiper shafts 12, 14 from a rotary drive member 16 having a crank arm 18. A drive link 20 is provided having first, second, and third connection points 22, 24, and 26 respectively. The first connection point 22 is disposed adjacent one end 28 of the drive link 20 and is pivotally connectable to the crank arm 18 of the rotary drive member 16. The second connection point 24 is disposed adjacent an opposite end 30 of the drive link 20. The third connection point 26 is interposed between the first connection point 22 and the second connection point 24 along the drive link 20.

Idler pivot link means 32 is connectable to at least one of the pair of spaced wiper shafts 12, 14 for imparting lower acceleration oscillation in proximity to a nominal reversal position 34a, 34b of each connected wiper shaft 12, 14 than the acceleration imparted intermediate an inner position 36a, 36b and the reversal position 34a, 34b of each connected wiper shaft 12, 14. The idler pivot means 32 is rotatable about a fixed axis 38 and is connectable to at least one of the pair of spaced wiper shafts 12, 14 for imparting a dwell in oscillation in proximity to the parked position 36a, 36b of the at least one of the connected wiper shafts 12, 14. The idler pivot link means 32 can include an idler pivot link 40 pivotable about the fixed axis 38 and having at least three crank arms 42, 44, 46 extending radially from the fixed axis 38 and spaced from one another. A first elongate link 48 is pivotally connected at one end 50 to a first crank arm 42 of the idler pivot link 40 and is pivotally connected at an opposite end 52 to the second connection point 24 of the drive link 20. A second elongate link 54 is pivotally connected at one end 56 to a second crank arm 44 of the idler pivot link 40 and is pivotally connected at an opposite end 58 to the third connection point 26 of the drive link 20. The first and second elongate links 48, 54 cross with respect to one another between the idler pivot link 40 and the drive link 20. A third elongate link 60 is pivotally connected at one end 62 to a third crank arm 46 of the idler pivot link 40 and is pivotally connectable at an opposite end 64 for driving a first one of the pair of spaced wiper shafts 12, 14.

Figure 7:
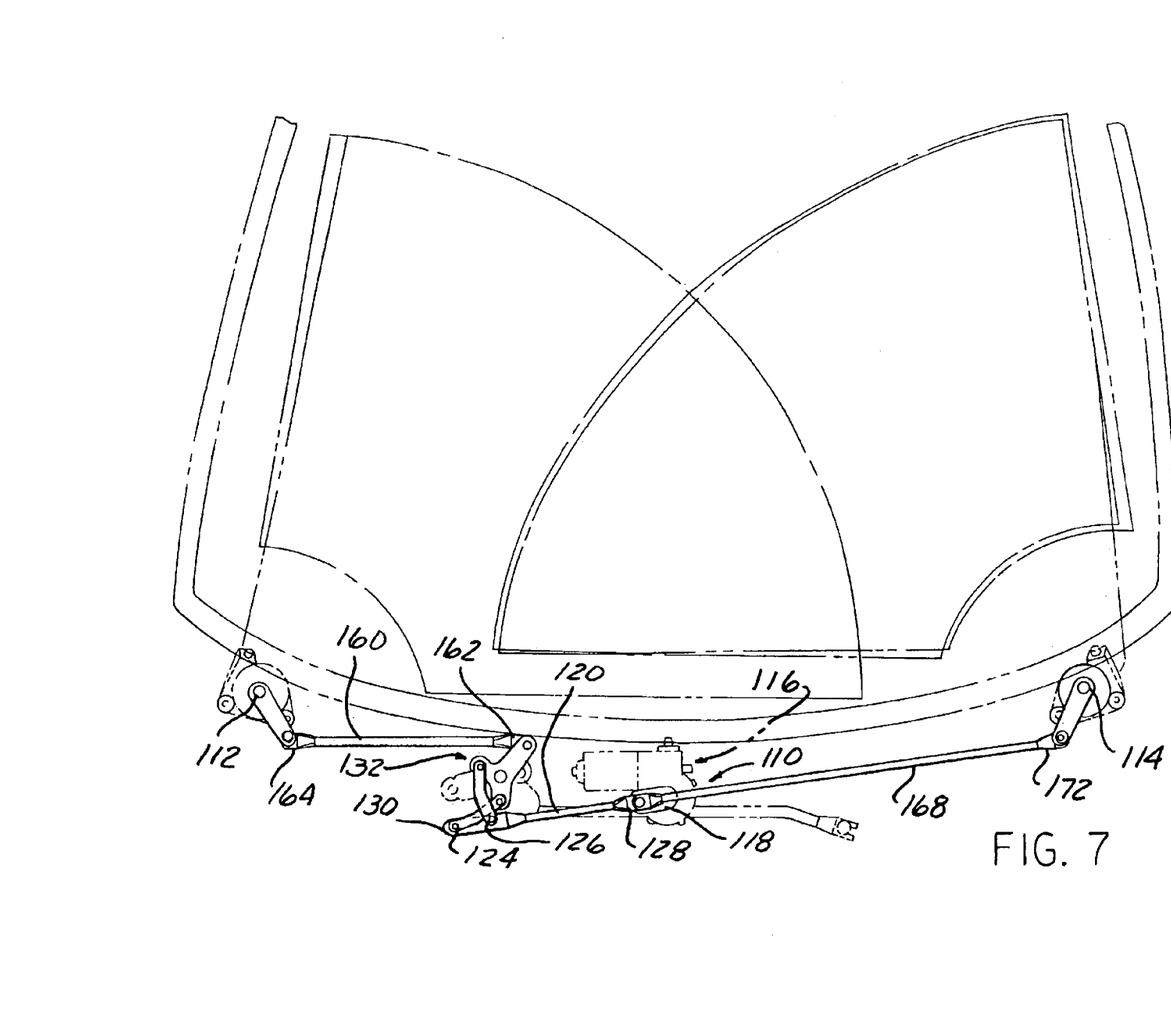
FIG. 7 is a plan view of an alternative configuration of the windshield wiper drive according to the present invention with the windshield wiper in the outer position.
Figure 8:
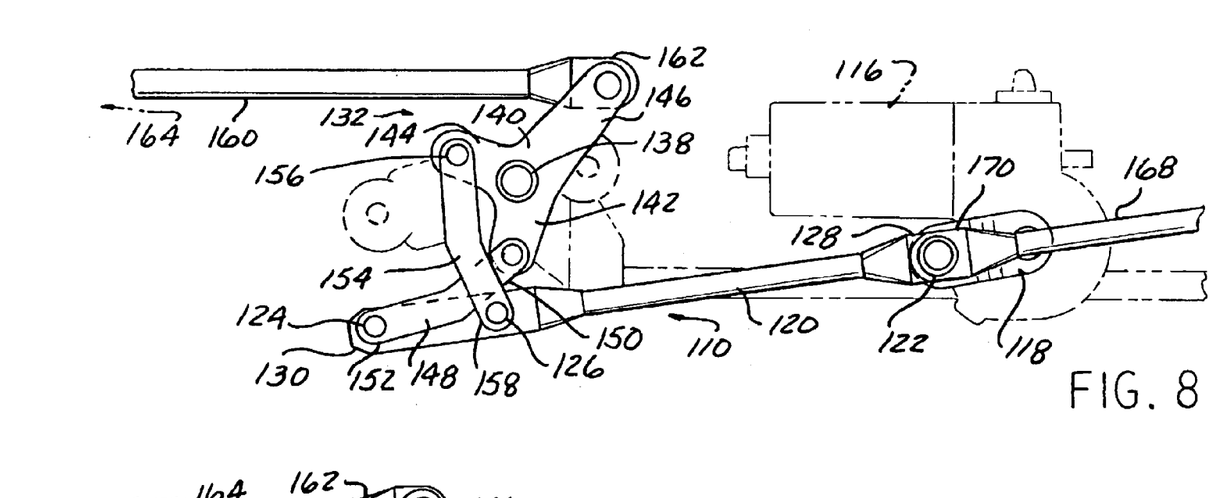
FIG. 8 is a detailed view of the windshield wiper drive of FIG. 7 with the windshield wiper in the outermost oscillatory position.
Figure 9:
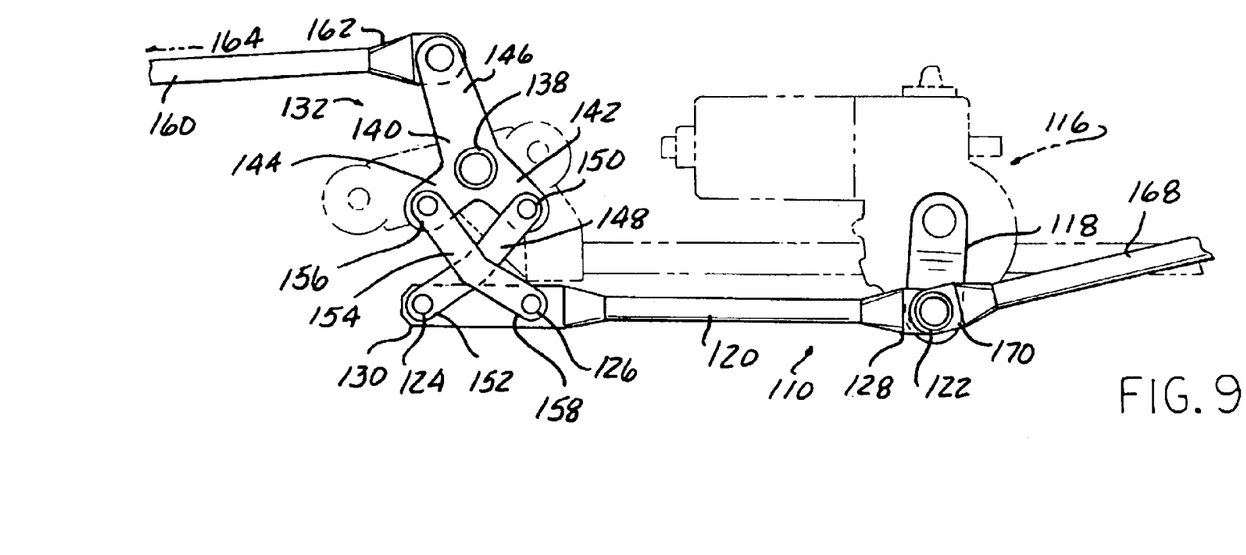
FIG. 9 is a detailed view of the windshield wiper drive of FIG. 8 with the wiper oscillated to an intermediate position.
Figure 10:
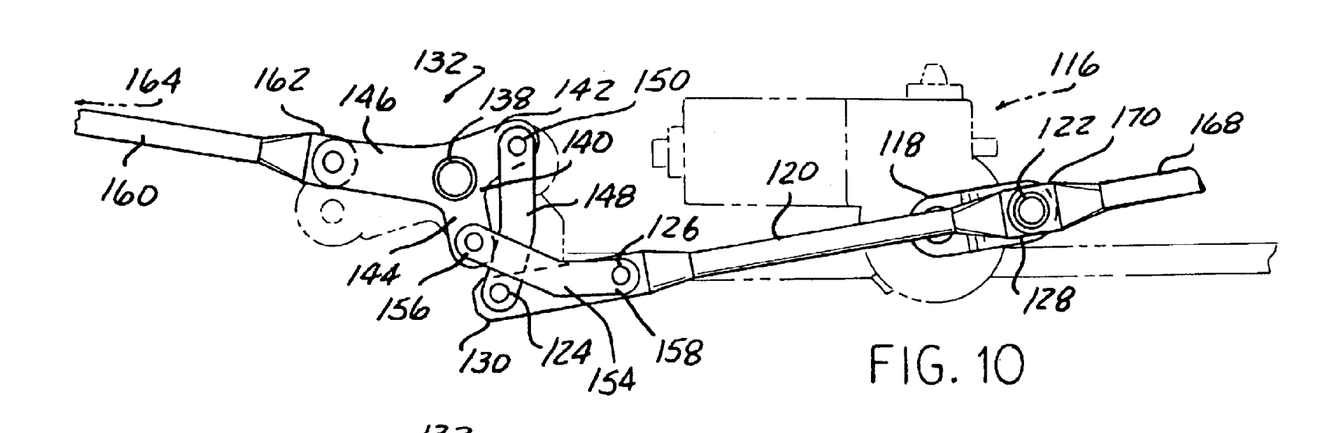
FIG. 10 is a detailed view of the windshield wiper drive of FIG. 8 with the wiper oscillated to an inner position.
Figure 11:
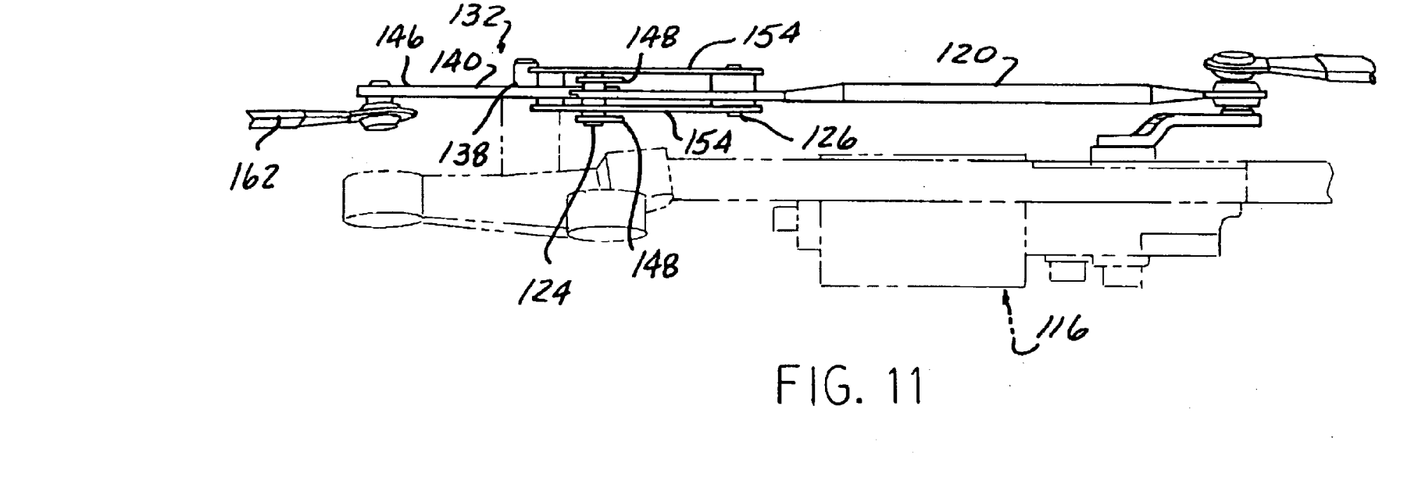
FIG. 11 is a side elevational view of the idler pivot link for the windshield wiper drive of FIG. 8.

If both spaced wiper shafts 12, 14 are to be driven by the windshield wiper drive 10 according to the present invention, the idler pivot link 40 can include a fourth crank arm 66, and a fourth elongate link 68 can be pivotally connected at one end 70 to the fourth crank arm 66 of the idler pivot link 40 and can be pivotally connectable at an opposite end 72 for driving a second one of the pair of spaced wiper shafts 12, 14. Alternatively, as best seen in FIGS. 7–11, a fourth elongate link 168 can be pivotally connectable at one end 170 to the crank arm 118 of the rotary drive member 116 and can be pivotally connectable at an opposite end 172 for driving a second one of the pair of spaced wiper shafts 112, 114.

In the preferred configuration, the first, second, and third crank arms 42, 44, 46 of the idler pivot link 40 are spaced angularly from one another about the fixed axis 38. The fixed axis 38 of rotation for the idler pivot link 40 is spaced from the wiper shafts 12, 14. The wiper drive system according to the present invention provides low acceleration, symmetrical overlap of the wiper blade sweep area. This type of system is sometimes referred to as a butterfly system. Current symmetrical overlap systems must have the top wiper arm start with a high acceleration to move the upper wiper arm out of the way prior to the bottom wiper arm movement. In addition, the upper wiper arm in current systems is required to finish slowly. The bottom arm in current systems must start with a low acceleration and finish with a high acceleration. This movement causes the bottom arm to have large pattern growth due to high acceleration adjacent the reversal position for current systems, allowing the arm to strike the car body at the pillar. The top arm also has a tendency to strike the bottom arm in current systems when the top arm returns to the parked position. The present invention allows the top wiper arm to have a normal wipe motion and dwells the bottom wiper arm prior to allowing the bottom wiper arm to proceed with normal motion. The present invention makes use of a cross linkage design, sometimes referred to as a "Tchbeysheff" cross linkage, to allow the idler pivot to have a much greater turning angle allowing the linkage to dwell until the other arm moves out of the way before proceeding in a normal motion.

Referring now to FIGS. 7–11, an alternative embodiment of the windshield wiper device 110 according to the present invention is illustrated. The windshield wiper drive 110 imparts overlapping butterfly oscillation to a pair of spaced wiper shafts 112, 114 from a rotary drive member 116 having a crank arm 118. A drive link 120 is disclosed having first, second, and third connection points 122, 124, 126 respectively. The first connection point 122 is disposed adjacent one end 128 of the drive link 120 and is pivotally connectable to the crank arm 118 of the rotary drive member 116. The second connection point 124 is disposed adjacent an opposite end 130 of the drive link 120. The third connection point 126 is interposed between the first connection point 122 and the second connection point 124 along the drive link 120.

Idler pivot link means 132 is connectable to at least one of the pair of spaced wiper shafts 112, 114 for imparting lower acceleration oscillation in proximity to a reversal position 34a, 34b (shown in FIG. 2) of each connected wiper shaft 112, 114 than the acceleration imparted intermediate an inner position 36a, 36b (FIG. 2) and the reversal position 34a, 34b of each connected wiper shaft 112, 114. The idler pivot link means 132 is rotatable about a fixed axis 138 and is connectable to at least one of the pair of spaced wiper shafts 112, 114 for imparting a dwell in oscillation in proximity to the inner position 36a, 36b of the at least one of the connected wiper shafts 112, 114. The idler pivot link means 132 can include an idler pivot link 140 pivotable about the fixed axis 138 and having at least three crank arms 142, 144, 146 extending radially from the fixed axis 138 and spaced from one another. A first elongate link 148 is pivotally connected at one end 150 to a first crank arm 142 of the idler pivot link 140 and is pivotally connected at an opposite end 152 to the second connection point 124 of the drive link 120. A second elongate link 154 is pivotally connected at one end 156 to a second crank arm 144 of the idler pivot link 140 and is pivotally connected at an opposite end 158 to the third connection point 126 of the drive link 120. The first and second elongate links 148, 154 cross with respect to one another between the idler pivot link 140 and the drive link 120. A third elongate link 160 is pivotally connected at one end 162 to a third crank arm 146 of the idler pivot link 140 and is pivotally connectable at an opposite end 164 for driving a first one of the pair of spaced wiper shafts 112, 114.

If both spaced wiper shafts 112, 114 are to be driven by the windshield wiper drive 110 according to the present invention, a fourth elongate link 168 can be provided to be pivotally connectable at one end 170 to the crank arm 118 of the rotary drive member 116, and pivotally connectable at an opposite end 172 for driving a second one of the pair of spaced wiper shafts 112, 114. Alternatively, as shown in FIGS. 1–6, a fourth elongate link 68 can be provided to be pivotally connected at one end 70 to a fourth crank arm 66 formed on the idler pivot link 40 and pivotally connectable at an opposite end 72 for driving a second one of the pair of spaced wiper shafts 12, 14.

The first, second, and third crank arms 142, 144, 146 of the idler pivot link 140 preferably are spaced angularly from one another about the fixed axis 138. The fixed axis 138 of rotation for the idler pivot link 140 is spaced from the wiper shafts 112, 114. The idler pivot link 40, or 140, allows a greatly increased turning angle to permit the linkage to dwell until the other arm moves out of the way before proceeding in a normal motion. This eliminates the high acceleration of the bottom wiper arm at the reversal position and substantially reduces the pattern growth at high oscillation speeds to prevent the wiper arm from striking the car body at the pillar. The present invention allows the top wiper arm to have a normal wipe motion and dwells the bottom wiper arm prior to allowing the bottom wiper arm to proceed with a normal wipe motion.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation 80 as to encompass all such modifications and equivalent structures as is permitted under the law.

What is claimed is:

1. A windshield wiper drive for imparting overlapping butterfly oscillation to a pair of spaced wiper shafts from a rotary drive member having a crank arm comprising:

a drive link having first, second, and third connection points, the first connection point adjacent one end of the drive link and pivotally connectible to the crank arm of the rotary drive member, the second connection point adjacent an opposite end of the drive link, and the third connection point interposed between the first connection point and the second connection point along the drive link;

an idler pivot link pivotable about a fixed axis and having at least three crank arms extending radially from the fixed axis and spaced from one another, the fixed axis of the idler pivot link being separate and independent of the pair of spaced wiper shafts to be driven;

a first elongate link pivotally connected at one end to a first crank arm of the idler pivot link and pivotally connected at an opposite end to the second connection point of the drive link;

a second elongate link pivotally connected at one end to a second crank arm of the idler pivot link and pivotally connected at an opposite end to the third connection point of the drive link, the first and second elongate links crossing with respect to one another; and a third elongate link pivotally connected at one end to a third crank arm of the idler pivot link and pivotally connectible at an opposite end for driving a first one of the pair of spaced wiper shafts.

2. The windshield wiper drive of claim 1 further comprising:

a fourth elongate link pivotally connectible at one end to the crank arm of the rotary drive member and pivotally connectible at an opposite end for driving a second one of the pair of spaced wiper shafts.

3. The windshield wiper drive of claim 1 further comprising:

the first, second, and third crank arms of the idler pivot link spaced angularly from one another about the fixed axis.

4. The windshield wiper drive of claim 1 further comprising:

the fixed axis of rotation for the idler pivot link located in a position spaced in between the crank arm of the rotary drive member and one of the wiper shafts to be driven.

5. A windshield wiper drive for imparting overlapping butterfly oscillation to a pair of spaced wiper shafts from a rotary drive member having a crank arm comprising:

a drive link having first, second, and third connection points, the first connection point adjacent one end of the drive link and pivotally connectible to the crank arm of the rotary drive member, the second connection point adjacent an opposite end of the drive link, and the third connection point interposed between the first connection point and the second connection point along the drive link;

an idler pivot link pivotable about a fixed axis and having at least three crank arms extending radially from the fixed axis and spaced from one another, the idler pivot link having a fourth crank arm;

a first elongate link pivotally connected at one end to a first crank arm of the idler pivot link and pivotally connected at an opposite end to the second connection point of the drive link;

a second elongate link pivotally connected at one end to a second crank arm of the idler pivot link and pivotally connected at an opposite end to the third connection point of the drive link, the first and second elongate links crossing with respect to one another;

a third elongate link pivotally connected at one end to a third crank arm of the idler pivot link and pivotally connectible at an opposite end for driving a first one of the pair of spaced wiper shafts; and a fourth elongate link pivotally connected at one end to the fourth crank arm of the idler pivot link and pivotally connectible at an opposite end for driving a second one of the pair of spaced wiper shafts.

6. In a windshield wiper drive system for imparting overlapping butterfly oscillation to a pair of spaced wiper shafts, the improvement comprising:

idler pivot link means connectible to at least one of the pair of spaced wiper shafts for imparting lower acceleration oscillation in proximity to a reversal position of each connected wiper shaft than imparted intermediate a park position and the reversal position of each connected wiper shaft, the idler pivot link means having a fixed axis of rotation spaced from the wiper shafts, wherein the idler pivot link means further includes a drive link having first, second, and third connection points, the first connection point adjacent one end of the drive link and pivotally connectible to a crank arm of a rotary drive member, the second connection point adjacent an opposite end of the drive link, and the third connection point interposed between the first connection point and the second connection point along the drive link, an idler pivot link pivotable about a fixed axis and having at least three crank arms extending radially from the fixed axis and spaced from one another, a first elongate link pivotally connected at one end to a first crank arm of the idler pivot link and pivotally connected at an opposite end to the second connection point of the drive link, a second elongate link pivotally connected at one end to a second crank arm of the idler pivot link and pivotally connected at an opposite end to the third connection point of the drive link, the first and second elongate links crossing with respect to one another, and a third elongate link pivotally connected at one end to a third crank arm of the idler pivot link and pivotally connectible at an opposite end for driving a first one of the pair of spaced wiper shafts.

7. The improvement of claim 6 further comprising:
a rotary drive member having a crank arm connectible to the idler pivot link means for driving the idler pivot link means in rotation about a fixed axis.

8. The improvement of claim 6 further comprising:
the idler pivot link means for imparting a dwell in oscillation to one of the connected wiper shafts allowing sufficient movement of the other wiper shaft to clear a path for oscillation from the park position of the one connected wiper shaft after the dwell in oscillation.

9. The improvement of claim 6 further comprising:
a fourth elongate link pivotally connectible at one end to the crank arm of the rotary drive member and pivotally connectible at an opposite end for driving a second one of the pair of spaced wiper shafts.

10. The improvement of claim 6 further comprising:
the first, second, and third crank arms of the idler pivot link spaced angularly from one another about the fixed axis.

11. In a windshield wiper drive system for imparting overlapping butterfly oscillation to a pair of spaced wiper shafts, the improvement comprising:

a drive link having first, second, and third connection points, the first connection point adjacent one end of the drive link and pivotally connectible to a crank arm of a rotary drive member, the second connection point adjacent an opposite end of the drive link, and the third connection point interposed between the first connection point and the second connection point along the drive link;

an idler pivot link pivotable about a fixed axis and having at least three crank arms extending radially from the fixed axis and spaced from one another, the idler pivot link connectible to at least one of the pair of spaced wiper shafts for imparting lower acceleration oscillation in proximity to a reversal position of each connected wiper shaft than imparted intermediate a park position and the reversal position of each connected wiper shaft, the idler pivot link having a fourth crank arm;

a first elongate link pivotally connected at one end to a first crank arm of the idler pivot link and pivotally connected at an opposite end to the second connection point of the drive link;

a second elongate link pivotally connected at one end to a second crank arm of the idler pivot link and pivotally connected at an opposite end to the third connection point of the drive link, the first and second elongate links crossing with respect to one another;

a third elongate link pivotally connected at one end to a third crank arm of the idler pivot link and pivotally connectible at an opposite end for driving a first one of the pair of spaced wiper shafts; and a fourth elongate link pivotally connected at one end to the fourth crank arm of the idler pivot link and pivotally connectible at an opposite end for driving a second one of the pair of spaced wiper shafts.

12. In a windshield wiper drive system for imparting overlapping butterfly oscillation to a pair of spaced wiper shafts, the improvement comprising:

a drive link having first, second, and third connection points, the first connection point adjacent one end of the drive link and pivotally connectible to a crank arm of a rotary drive member, the second connection point adjacent an opposite end of the drive link, and the third connection point interposed between the first connection point and the second connection point along the drive link;

an idler pivot link pivotable about a fixed, axis and having at least three crank arms extending radially from the fixed axis and spaced from one another, the idler pivot link connectible to at least one of the pair of spaced wiper shafts for imparting lower acceleration oscillation in proximity to a reversal position of each connected wiper shaft than imparted intermediate a park position and the reversal position of each connected wiper shaft, the fixed axis of rotation for the idler pivot link spaced from the wiper shafts;

a first elongate link pivotally connected at one end to a first crank arm of the idler pivot link and pivotally connected at an opposite end to the second connection point of the drive link;

a second elongate link pivotally connected at one end to a second crank arm of the idler pivot link and pivotally connected at an opposite end to the third connection point of the drive link, the first and second elongate links crossing with respect to one another;

a third elongate link pivotally connected at one end to a third crank arm of the idler pivot link and pivotally connectible at an opposite end for driving a first one of the pair of spaced wiper shafts.

13. In a windshield wiper drive system for imparting overlapping butterfly oscillation to a pair of spaced wiper shafts, the improvement comprising:

idler pivot link means rotatable about a fixed axis and connectible to at least one of the pair of spaced wiper shafts for imparting a dwell in oscillation in proximity to a park position of the at least one of the connected wiper shafts, the idler pivot link means having an axis of rotation spaced from the wiper shafts, wherein the idler pivot link means further includes a drive link having first, second, and third connection points, the first connection point adjacent one end of the drive link and pivotally connectible to a crank arm of a rotary drive member, the second connection point adjacent an opposite end of the drive link, and the third connection point interposed between the first connection point and the second connection point along the drive link, an idler pivot link pivotable about a fixed axis and having at least three crank arms extending radially from the fixed axis and spaced from one another, a first elongate link pivotally connected at one end to a first crank arm of the idler pivot link and pivotally connected at an opposite end to the second connection point of the drive link, a second elongate link pivotally connected at one end to a second crank arm of the idler pivot link and pivotally connected at an opposite end to the third connection point of the drive link, the first and second elongate links crossing with respect to one another, and a third elongate link pivotally connected at one end to a third crank arm of the idler pivot link and pivotally connectible at an opposite end for driving a first one of the pair of spaced wiper shafts.

14. The improvement of claim 13 further comprising:

a rotary drive member having a crank arm connectible to the idler pivot link means for driving the idler pivot link means in rotation about the fixed axis.

15. The improvement of claim 13 further comprising:

a fourth elongate link pivotally connectible at one end to the crank arm of the rotary drive member and pivotally connectible at an opposite end for driving a second one of the pair of spaced wiper shafts.

16. The improvement of claim 13 further comprising:

the first, second, and third crank arms of the idler pivot link spaced angularly from one another about the fixed axis.

17. In a windshield wiper drive system for imparting overlapping butterfly oscillation to a pair of spaced wiper shafts, the improvement comprising:

a drive link having first, second, and third connection points, the first connection point adjacent one end of the drive link and pivotally connectible to a crank arm of a rotary drive member, the second connection point adjacent an opposite end of the drive link, and the third connection point interposed between the first connection point and the second connection point along the drive link;

an idler pivot link pivotable about a fixed axis and having at least three crank arms extending radially from the fixed axis and spaced from one another, the idler pivot link rotatable about a fixed axis and connectible to at least one of the pair of spaced wiper shafts for imparting a dwell in oscillation in proximity to a park position of the at least one of the connected wiper shafts, the idler pivot link having a fourth crank arm;

a first elongate link pivotally connected at one end to a first crank arm of the idler pivot link and pivotally connected at an opposite end to the second connection point of the drive link;

a second elongate link pivotally connected at one end to a second crank arm of the idler pivot link and pivotally connected at an opposite end to the third connection point of the drive link, the first and second elongate links crossing with respect to one another;

a third elongate link pivotally connected at one end to a third crank arm of the idler pivot link and pivotally connectible at an opposite end for driving a first one of the pair of spaced wiper shafts; and a fourth elongate link pivotally connected at one end to the fourth crank arm of the idler pivot link and pivotally connectible at an opposite end for driving a second one of the pair of spaced wiper shafts.

18. In a windshield wiper drive system for imparting overlapping butterfly oscillation to a pair of spaced wiper shafts, the improvement comprising:

a drive link having first, second, and third connection points, the first connection point adjacent one end of the drive link and pivotally connectible to a crank arm of a rotary drive member, the second connection point adjacent an opposite end of the drive link, and the third connection point interposed between the first connection point and the second connection point along the drive link;

an idler pivot link pivotable about a fixed axis and having at least three crank arms extending radially from the fixed axis and spaced from one another, the idler pivot link rotatable about a fixed axis and connectible to at least one of the pair of spaced wiper shafts for imparting a dwell in oscillation in proximity to a park position of the at least one of the connected wiper shafts, the fixed axis of rotation for the idler pivot link spaced from the wiper shafts;

a first elongate link pivotally connected at one end to a first crank arm of the idler pivot link and pivotally connected at an opposite end to the second connection point of the drive link;

a second elongate link pivotally connected at one end to a second crank arm of the idler pivot link and pivotally connected at an opposite end to the third connection point of the drive link, the first and second elongate links crossing with respect to one another; and a third elongate link pivotally connected at one end to a third crank arm of the idler pivot link and pivotally connectible at an opposite end for driving a first one of the pair of spaced wiper shafts.

* * * * *